United States Patent
Allen et al.

(10) Patent No.: US 10,832,071 B2
(45) Date of Patent: Nov. 10, 2020

(54) DYNAMIC DETERMINATION OF HUMAN GESTURES BASED ON CONTEXT

(71) Applicant: INTERNATIONAL BUSINESS MACHINES CORPORATION, Armonk, NY (US)

(72) Inventors: Corville O. Allen, Morrisville, NC (US); Albert A. Chung, Cary, NC (US); Ravi K. Muthukrishnan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 15/255,008

(22) Filed: Sep. 1, 2016

(65) Prior Publication Data
US 2018/0060706 A1 Mar. 1, 2018

(51) Int. Cl.
 *G06K 9/00* (2006.01)
 *G06K 9/20* (2006.01)
 *G06F 3/01* (2006.01)
 *G06K 9/72* (2006.01)

(52) U.S. Cl.
 CPC .......... *G06K 9/2081* (2013.01); *G06F 3/017* (2013.01); *G06K 9/00221* (2013.01); *G06K 9/00355* (2013.01); *G06K 9/72* (2013.01)

(58) Field of Classification Search
 CPC ................. G09B 19/0038; G09B 5/02; A63B 2069/0055; A63B 2071/025; A63B 2071/0625
 USPC .................. 382/103; 455/416; 704/243, 276; 345/156, 158; 434/112
 See application file for complete search history.

(56) References Cited

U.S. PATENT DOCUMENTS

| | | | | |
|---|---|---|---|---|
| 8,457,353 | B2* | 6/2013 | Reville | G06F 3/017 382/103 |
| 8,523,572 | B2* | 9/2013 | Liebermann | G09B 21/04 434/112 |
| 8,896,529 | B2* | 11/2014 | Immonen | G06F 3/017 345/156 |
| 2013/0085849 | A1 | 4/2013 | Dyor et al. | |
| 2013/0086056 | A1 | 4/2013 | Dyor et al. | |
| 2014/0007022 | A1 | 1/2014 | Tocino Diaz et al. | |
| 2015/0324352 | A1 | 11/2015 | Meyer et al. | |

(Continued)

OTHER PUBLICATIONS

IBM; "System and Method to allow for cultural gesturing within a virtual world"; http://ip.com/IPCOM/000179916D; Mar. 2, 2009.

(Continued)

*Primary Examiner* — Charlotte M Baker
(74) *Attorney, Agent, or Firm* — Conley Rose, P.C.

(57) ABSTRACT

A system comprises a processor configured to execute instructions to receive an indication of an occurrence of a human gesture and to perform an analysis of the indication of the occurrence of the human gesture to determine contextual criteria having a relationship to the occurrence of the human gesture. The processor may determine a meaning of the human gesture based at least in part on the contextual criteria and a plurality of possible intended meanings for the human gesture. The processor also may execute an instruction respective to determining the meaning of the human gesture, wherein at least a portion of the instruction is dependent upon the meaning of the human gesture.

15 Claims, 7 Drawing Sheets

(56) References Cited

U.S. PATENT DOCUMENTS

2017/0006009 A1* 1/2017 Hessler .................. G06F 21/10

OTHER PUBLICATIONS

Anonymously; "Method and System for Customizing Culture-Based Translation of Nonverbal Communication in Video Conference Systems"; http://ip.com/IPCOM/000239192; Oct. 20, 2014.
Anonymously; "System and Method of Gesture based Human identification Protocol"; http:ip.com/IPCOM/000222905D; Oct. 20, 2012.
Mell et al.; "The NIST Definition of Cloud Computing"; National Institute of Standards and Technology, Special Publication 800-145; Sep. 2011.

* cited by examiner

DYNAMIC DETERMINATION OF HUMAN GESTURES BASED ON CONTEXT

BACKGROUND

The present disclosure relates to the field of image recognition, and more specifically, to determination of contextual meaning according to image recognition.

Human gestures have, in many societies across the world, become an integral aspect of communications. Gestures such as a movement of the head in one or more directions or along one or more axes, movement of the arms, legs, face, or hands, as just a few examples, may relay information to an observer without requiring an audible utterance. However, with a proliferation in gestures that are used as aspects of communication comes an increased possibility that a gesture considered customary and normal in one portion of the world may be considered highly offensive and out of place in another portion of the world. From region to region, whether the region is a state, province, country, continent, or other geographically defined area, cultural and social normality or customs may vary drastically. Similarly, some gestures may take on any one, or more, of a plurality of meanings based upon the circumstances of their user. Gesture recognition systems of the current state of the art generally identify a gesture itself, but are incapable of providing advanced analytics to better understand the identified gesture and a probable meaning for the gesture based on a manner of use, or a context, of the gesture. Therefore, a capability of determining a meaning of human gestures according to advanced analytics may be desirable.

SUMMARY

In one embodiment, a computer program product comprises a computer readable storage medium having program instructions embodied therewith for execution by a processor. When executed, the instructions are configured to determine a contextual meaning of human gestures. Executing the program instructions causes the processor to receive a visual image asset that includes a plurality of pixels that collectively depict a content of the visual image asset. Executing the program instructions further causes the processor to analyze the plurality of pixels according to a first digital image analysis protocol to determine at least one indicia of a context associated with the content of the visual image asset. Executing the program instructions further causes the processor to analyze the plurality of pixels according to a second digital image analysis protocol to determine a gesture indicated by the content of the visual image asset. Executing the program instructions further causes the processor to perform a semantic mapping to determine the contextual meaning of the gesture based on the at least one indicia of the context and the determined gesture. Executing the program instructions further causes the processor to execute, responsive to determining the contextual meaning of the gesture, an operation having at least one function dependent upon the contextual meaning of the gesture. The disclosed embodiment advantageously determines a meaning of a gesture depicted in a visual image asset such as a photograph and/or a video based on a determined context in which the gesture is performed, thereby determining a more accurate meaning of the gesture when compared to systems of the current state of the art.

Optionally, execution of the program instructions to perform the semantic mapping to determine the contextual meaning of the gesture further may cause the processor to determine a geographic area associated with the at least one indicia of context. Executing the program instructions further causes the processor to determine one or more cultural or societal customs corresponding to the geographic area associated with the at least one indicia of context. Executing the program instructions further causes the processor to determine one or more possible meanings of the gesture. Executing the program instructions further causes the processor to map the one or more cultural or societal customs to the one or more possible meanings of the gesture to determine a probability of accuracy for each of the one or more possible meanings of the gesture according to the geographic area associated with the at least one indicia of the context indicated. Executing the program instructions further causes the processor to determine a possible meaning of the gesture having a highest determined probability of accuracy and selected from among the one or more possible meanings of the gestures as the contextual meaning of the gesture. The disclosed embodiment has the advantage of determining a meaning of a gesture depicted in a visual image asset such as a photograph and/or a video based on cultural and societal customs in the geographic area in which the gesture is performed, thereby determining a more accurate meaning of the gesture when compared to systems of the current state of the art.

In another embodiment, a computer-implemented method, performable by a computing device, may include receiving a digital media asset comprising a plurality of pixels and performing a first image analysis of the digital media asset at a pixel-based level to determine a gesture embodied within the digital media asset according to a first relationship among the plurality of pixels of the digital media asset. The computer-implemented method may further include performing a second image analysis of the digital media asset at the pixel-based level to determine a context of the gesture according to a second relationship among the plurality of pixels of the digital media asset. The computer-implemented method may further include determining a cultural meaning of the gesture based on the determined gesture and the context of the gesture. The disclosed embodiment beneficially determines a meaning of a gesture depicted in a digital media asset such as a photograph and/or a video based on a determined cultural context in which the gesture is performed, thereby determining a more accurate meaning of the gesture when compared to systems of the current state of the art.

Optionally, the computer-implemented method may further include determining an area associated with the context of the gesture. The computer-implemented method may further include determining a plurality of potential meanings of the determined gesture. The computer-implemented method may further include determining the cultural meaning of the gesture based on the plurality of potential meanings of the determined gesture and the area associated with the context of the gesture. The computer-implemented method may further include determining a score for each of a plurality of context metadata values based on the content of the digital media asset. The computer-implemented method may further include mapping each of the plurality of context metadata values to each of the plurality of potential meanings of the determined gesture to associate an accumulated score with each of the plurality of potential meanings of the determined gesture. The computer-implemented method may further include selecting the cultural meaning of the gesture as one of the plurality of potential meanings of the determined gesture from among the plurality of potential meanings of the determined gesture based at least in part on a determination that the accumulated score of the one of the plurality of potential meanings for the determined gesture exceeds a threshold. The disclosed embodiment has the advantage of determining a meaning of a gesture depicted in a digital media asset such as a photograph and/or a video based on an area in which the gesture is performed and a scoring system, thereby determining a more accurate meaning of the gesture when compared to systems of the current state of the art.

In another embodiment, a system comprises a processor configured to execute instructions to receive an indication of an occurrence of a human gesture and to perform an analysis of the indication of the occurrence of the human gesture to determine contextual criteria having a relationship to the occurrence of the human gesture. The processor may determine a meaning of the human gesture based at least in part on the contextual criteria and a plurality of possible intended meanings for the human gesture. The processor also may execute an instruction respective to determining the meaning of the human gesture, wherein at least a portion of the instruction is dependent upon the meaning of the human gesture. The disclosed embodiment has the advantage of determining a meaning of a human gesture based on contextual criteria, thereby determining a more accurate meaning of the human gesture when compared to systems of the current state of the art.

In some embodiments, the indication of the occurrence of the human gesture may include a visual image asset, and the contextual criteria may be determined based on surroundings of the human gesture in the visual image asset. Such embodiments advantageously determine a meaning of a human gesture depicted in a visual image asset such as a photograph and/or a video based surroundings of the human gesture, thereby determining a more accurate meaning of the human gesture when compared to systems of the current state of the art.

In yet other embodiments, the plurality of possible intended meanings for the human gesture may be filtered according to the contextual criteria to determine the meaning of the human gesture. Such embodiments determine a meaning of a human gesture depicted in a visual image asset such as a photograph and/or a video according to a context-based filtering, thereby determining a more accurate meaning of the human gesture when compared to systems of the current state of the art.

DETAILED DESCRIPTION

Figure 1:
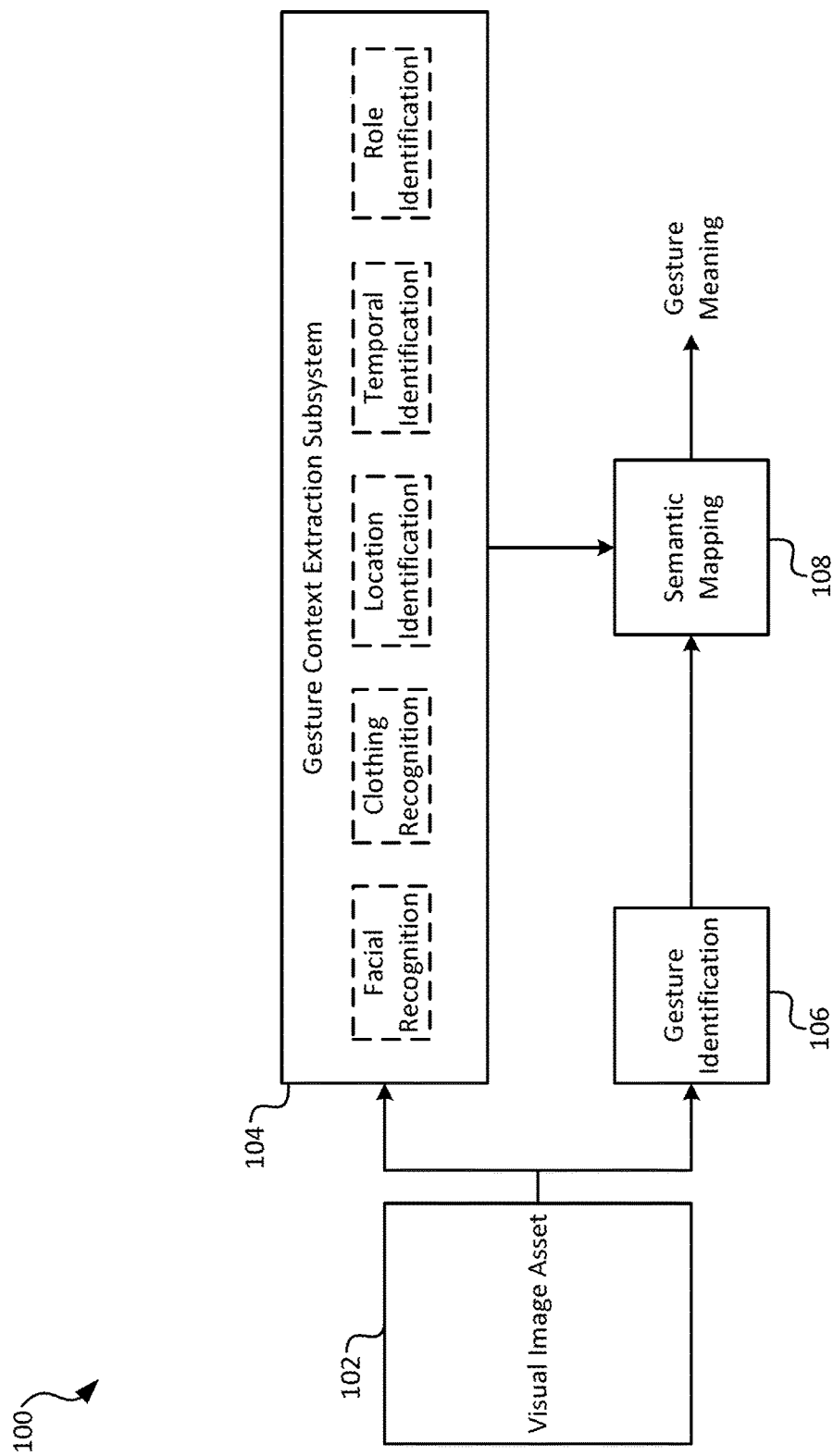
FIG. 1 depicts a block diagram of a system for determining a contextual meaning of a human gesture according to various embodiments.

Human gestures may, in various context, take on any of a wide variety of meanings. With a rise in desirability of automated actions and electronic systems capable of interaction with humans at an advanced level, a corresponding desire for these electronic systems to have an understanding of human gestures may be equally desirable. However, a true meaning of human gestures is often determined by other humans based on a group of generally accepted possible meanings for the human gesture and an environmental context in which the human gesture occurs. As such, electronic systems may lack an ability to correctly identify the true meaning of a human gesture because of a lack of understanding of environmental context information related to the human gesture. Accordingly, electronic systems of the current state of the art may be incapable of correctly identifying a true meaning of a human gesture that has multiple possible meanings through use of environmental context information.

Disclosed herein are embodiments that provide for determination of a meaning of a human gesture based on contextual information proximate and relevant to the human gesture. The disclosed embodiments enable an electronic system such as a computing device to determine, from among a plurality of possible meanings, a true meaning of a human gesture according to contextual information derived from characteristics of, or existing around, an individual who performs the human gesture at a time, or temporally near the time, when the human gesture is made. The determination of the meaning of the human gesture may be made based on one or more analyses of a visual image and/or digital media asset illustrating or depicting the individual performing the human gesture, as well as one or more indicia surrounding, or proximate to, the individual from which contextual information may be derived. In various embodiments, the analyses may be selected from among various forms of visual image analysis such as facial recognition, clothing recognition, location identification, temporal identification, role identification, object recognition, device recognition, etc.

For example, a guest entering a restaurant may hold up a hand with index and middle fingers extended and slightly separated such that they form a "V" shape to indicate that the guest is seeking seating for a party of two. In such a circumstance, the gesture may be interpreted as having a numerical meaning, particularly, the number of outstretched fingers—two. However, if a host or maitre d' of the restaurant holds up a hand with similarly extended fingers toward another employee of the restaurant, the gesture may have the same numerical meaning of two, or may be representative of a letter "V," for example, to signify a guest's status as a very important person (VIP). In yet other context, the same outstretched fingers may be representative of a peace sign. To determine the actual, or true, meaning based on the context in which the human gesture is performed, the computing device may determine the context in which the human gesture is performed and score all possible meanings for the human gesture based on the determined context to determine the true meaning of the human gesture.

Each of the above meanings is merely one of many valid and widely accepted possible meanings for the same exemplary human gesture, with the true meaning of the gesture depending on a context in which the gesture is made. In some circumstances, conflating the true meaning of the human gesture with another possible meaning of the human gesture may lead to unintended consequences. For example, a gesture that is common-place in one culture, ethnic group, religion, or portion of the world may be considered offensive, or even criminal, in another culture, ethnic group, religion, or portion of the world. As a result, for a computing device to efficiently and effectively process human gestures, it may be desirable to provide the computing device with contextual information for use in determining a true meaning of a human gesture.

It should be noted that although various discussions of the present disclosure may take place with reference to a singular image or photograph for the sake of simplicity and clarity of description, it is to be understood that the present disclosure is equally applicable to any number of images or photographs. For example, teachings of the present disclosure may be implemented for a single image or photograph, a plurality of images or photographs, or a video that comprises a plurality of frames (each of which may also be considered an image or photograph).

Turning now to FIG. 1, a block diagram of a system 100 for determining a contextual meaning of a human gesture according to various embodiments is shown. System 100 may be, for example, implemented by a computing device such as computing device 500, discussed below, to determine a meaning of a human gesture depicted in a visual image asset such as a photograph and/or a video. For example, as discussed below, system 100 may be implemented, at least in part, as the gesture meaning determination computer program product 560 of computing device 500. Additionally, each block of system 100 may be implemented on a separate computing device, for example, in a distributed manner, or may be implemented on a computing device together with any one or more other blocks of system 100. The disclosed embodiments of system 100 have the advantage of determining a meaning of a human gesture depicted in a visual image asset based on a determined context in which the human gesture is performed, thereby determining a more accurate meaning of the human gesture when compared to systems of the current state of the art. It should be understood that while system 100 is illustrated and described with reference to the following blocks, the functionality and/or features of one or more of the following blocks of system 100 may be omitted and/or combined with any one or more other blocks of system 100. Further, the following blocks of system 100 may be implemented in any order, may be implemented substantially concurrently (e.g., beginning and/or occurring at approximately the same time while not necessarily ending at the same time), consecutively, or both, and are not to be limited based on an order of discussion presented herein.

System 100 begins operation at block 102 with the computing device receiving a visual image asset depicting a human gesture performed by an entity (e.g., one or more persons and/or machines, as described below). It should be noted that the computing device may itself capture the visual image asset, for example, via a camera or other imaging sensor integrated in, or communicatively coupled to, the computing device, or may receive the visual image asset via a network from another computing device which captured the visual image asset. As such, a location of the computing device with respect to a location at which the visual image asset is captured or a location depicted within the visual image asset is not limited herein. The visual image asset may further depict one or more indicia of context located proximate to the entity performing the human gesture. The indicia of context may be of the entity performing the human gesture (e.g., physical features of the entity), may be related to the entity performing the human gesture (e.g., clothing and/or accessories worn by and/or associated with the entity), may be of an area proximate to the entity (e.g., geographic features, signs, graphics, and/or other identifiers that enable the computing device to determine an approximate location of the entity performing the human gesture), may be related to a time at which the entity performed the human gesture, may be related to a societal and/or professional role of the entity performing the human gesture, and/or may be any other person, object, and/or setting proximate to the entity performing the human gesture and which provides information that may tend to indicate a context in which the entity performed the human gesture. Additionally, as discussed previously, the visual image asset may be a single image or photograph, a plurality of images or photographs, or a video that comprises a plurality of frames (each of which may also be considered a discrete image or photograph). Each visual image asset may comprise a plurality of pixels, each of which define a portion of the visual image asset and collectively form a visual depiction of the visual image asset.

At block 104, a gesture context extraction subsystem, executed by the computing device, determines a context in which the entity performed the human gesture depicted in the visual image asset. To determine the context of the human gesture, the gesture context extraction subsystem may analyze the visual image asset to identify the one or more indicia of context located proximate to the entity performing the human gesture. The analysis may comprise processing the visual image asset according to one or more forms of image analysis, an analysis of metadata (e.g., Global Positioning Satellite (GPS) coordinates appended to the visual image asset that indicate an approximate location at which the visual image asset was captured, a time and/or date stamp appended to the visual image asset, etc.) associated with the visual image asset, or a combination of both. The one or more forms of image analysis may be digital image analysis protocols that include facial recognition, clothing recognition, location identification, temporal identification, role identification, and/or other forms of analysis that enable identification of information from within the visual image asset. Each of the forms of image analysis may analyze the visual image at a pixel-based level to determine related pixels (e.g., based on similarities and/or variations among the pixels) that together form an object of interest within the visual image asset. The object of interest may be, for example, the human gesture or the context of the human gesture. The related pixels may be determined according to a process of object detection, edge detection, color, texture, light intensity, contrast, etc.

In one embodiment, the computing device, via execution of the gesture context extraction subsystem, performs a facial recognition image analysis on the visual image asset. The computing device may perform the facial recognition image analysis to determine an existence of persons within the visual image asset, as well as determine one or more facial feature and/or other characteristics of an entity performing the human gesture and/or other entities depicted in the visual image asset as proximate to the entity performing the human gesture. The facial features may indicate a race, gender, ethnicity, culture, religion, or other like identity of the entity performing the human gesture or other entities depicted in the visual image asset as proximate to the entity performing the human gesture. The computing device may identify the facial features based on their absolute positions on the face of the entity and/or the position of one feature with respect to another facial feature. For example, the computing device may perform facial recognition image analysis by determining a relative and/or absolute position, size, and/or shape of the eyes, nose, ears, mouth, cheekbones, jaw, and/or other facial features of, or associated with, the entity's face. Based on the facial recognition image analysis, the computing device may identify a particular cultural, ethnic, religious, and/or social custom or normality associated with the entity, and/or a location depicted in the visual image asset at which the entity performed the human gesture. Based, at least in part, on the identified cultural, ethnic, religious, and/or social custom or normality, the computing device may determine the context in which the entity performed the human gesture depicted in the visual image asset.

In another embodiment, the computing device, via execution of the gesture context extraction subsystem, performs a clothing recognition image analysis on the visual image asset. The computing device may perform the clothing recognition image analysis to identify clothing and/or accessories worn by the entity performing the human gesture or other entities depicted in the visual image asset as proximate to the entity performing the human gesture. The clothing and/or accessories may indicate a culture, religion, or other like identity of the entity performing the human gesture or other entities depicted in the visual image asset as proximate to the entity performing the human gesture. The computing device may identify the clothing and/or accessories according to a process of object recognition in which pixels of the visual image asset are categorized (e.g., segmented and classified) via edge detection, similarity or difference in color, texture, light intensity, contrast, size, shape, etc. The computing device may compare the identified clothing to a database of references to determine the culture, religion, or other identity indicated by the clothing. Based on the clothing recognition image analysis and the culture, religion, or other identity indicated by the clothing, the computing device may identify a particular cultural, ethnic, religious, and/or social custom or normality associated with the entity, and/or a location depicted in the visual image asset at which the entity performed the human gesture. Based, at least in part, on the identified cultural, ethnic, religious, and/or social custom or normality, the computing device may determine the context in which the entity performed the human gesture depicted in the visual image asset.

In another embodiment, the computing device, via execution of the gesture context extraction subsystem, performs a location identification image analysis on the visual image asset. The computing device may perform the location identification image analysis to identify features of an area around the entity performing the human gesture as depicted in the visual image asset. The features may be, for example, geographic features such as mountains, a road, one or more buildings that form a skyline, text and/or image based signs, or features that suggest a particular setting such as an airplane, a train, a bus, a plurality of tables within a restaurant, etc. The features of the area around the entity performing the human gesture may indicate a region, country, location, and/or setting in which the human gesture is performed. The computing device may identify the features of the area around the entity performing the human gesture according to a process of object recognition and comparison to a database of references, as discussed above. Based on the location identification image analysis, the computing device may identify a particular cultural, ethnic, religious, and/or social custom or normality associated with the entity, and/or the area around the entity performing the human gesture. Based, at least in part, on the identified cultural, ethnic, religious, and/or social custom or normality, the computing device may determine the context in which the entity performed the human gesture depicted in the visual image asset.

In another embodiment, the computing device, via execution of the gesture context extraction subsystem, performs a temporal identification image analysis on the visual image asset. The computing device may perform the temporal identification image analysis to identify a time or period at which the entity performed the human gesture. The computing device may identify the time or period at least in part according to a process of object recognition, as discussed above. For example, according to the process of object recognition, the computing device may determine an existence of the sun, the moon, certain stellar constellations, groups of stars, individual stars, clocks, or other defining characteristics (e.g., a presence of an identifiable mode of public transportation that follows a known or predictable schedule, etc.), and thereby identify the time or period at which the entity performed the human gesture, for example, based on a comparison to a database of known information. Based on the temporal identification image analysis and the time or period at which the entity performed the human gesture, the computing device may identify a particular cultural, ethnic, religious, and/or social custom or normality associated with the entity, and/or a location depicted in the visual image asset at which the entity performed the human gesture. Based, at least in part, on the identified cultural, ethnic, religious, and/or social custom or normality, the computing device may determine the context in which the entity performed the human gesture depicted in the visual image asset.

In another embodiment, the computing device, via execution of the gesture context extraction subsystem, performs a role identification image analysis on the visual image asset. The computing device may perform the role identification image analysis to identify a role of the entity performing the human gesture and/or other entities depicted in the visual image asset as proximate to the entity performing the human gesture. The computing device may identify the role of the entity performing the human gesture and/or other entities depicted in the visual image asset as proximate to the entity performing the human gesture at least in part according to a process of object recognition and/or facial recognition, as discussed above. For example, based upon a combination of one or more of the foregoing forms of image analysis (e.g., facial recognition, clothing recognition, and location identification), the computing device may determine the role of the entity performing the human gesture and/or other entities depicted in the visual image asset as proximate to the entity performing the human gesture such that role provides information that may be relevant to the context of the human gesture. Based, at least in part, on the identified role, the computing device may determine the context in which the entity performed the human gesture depicted in the visual image asset.

In other embodiments, the computing device, via execution of the gesture context extraction subsystem, may perform further forms of analysis on the visual image asset to determine features and/or characteristics that may tend to indicate a context in which the entity performed the human gesture. For example, the computing device may perform a combination of the above forms of image analysis and/or processes (e.g., the object recognition process, as discussed above) to identify features and/or characteristics that may tend to indicate a context in which the entity performed the human gesture. As another example, the computing device may perform a form of image analysis that indicates that the entity performing the human gesture is utilizing and/or interacting with an electronic or other device, thereby suggesting that the human gesture may have a meaning defined by operational criteria of the electronic or other device with which the entity is interacting.

It should be noted that while certain forms of image analysis, as well as certain methods or processes for performing the various forms of image analysis, are discussed above, the present disclosure is not limited thereto. Additionally, the computing device may perform any one or more forms of image analysis to determine the context in which the entity performed the human gesture depicted in the visual image asset. The preceding examples merely illustrate some potential forms of image analysis, as well as some possible manners in which the forms of image analysis may be carried out while recognizing that any suitable form of image analysis that provides information about a context in which a visual image asset was captured and any suitable process for performing a form of image analysis are contemplated by, and within the scope of, the present disclosure.

At block 106, the computing device identifies the human gesture performed by the entity as depicted in the visual image asset. The computing device may identify the human gesture according to an object recognition image analysis, as discussed above. For example, the computing device may perform the object recognition image analysis to determine the human gesture performed by the entity according to a shape, an orientation, a size, or a color (e.g., according to a contrast of the human gesture against a background of the visual image asset) of the human gesture. Alternatively, the computing device may identify the gesture according to any other suitable form or process of image analysis that is capable of identifying a human gesture from within a visual image asset.

At block 108, the computing device receives the context determined at block 104 and the human gestured identified at block 106 and performs a semantic mapping to determine the contextual meaning of the human gesture based on the context determined at block 104 and the gestured identified at block 106. For example, the computing device may receive the human gesture identified at block 106 and perform a search to determine one or more possible meanings for the human gesture. The search may be of a database of predetermined possible meanings for a plurality of human gestures, an Internet or other network based search for possible meanings of the human gesture or other visually similar human gestures, or a combination of both. The database of predetermined possible meanings may be a database stored within the computing device, or alternatively, communicatively coupled to the computing device (e.g., via a network), that provides a ground truth of possible meanings for the plurality of gestures. For example, the database of predetermined possible meanings may be determined prior to operation of system 100 by a user by manually assigning (e.g., via a process of machine learning) one or more possible meanings to each of the plurality of human gestures.

After determining the one or more possible meanings for the human gesture, the computing device may filter the plurality of possible meanings for the human gesture according to the context determined at block 104. For example, the computing device may process the plurality of possible meanings for the human gesture and the context determined at block 104 according to a weighted analysis in which the computing device scores each possible meaning according to the context determined at block 104 and determines a possible meaning having a highest score over a threshold as the contextual meaning of the human gesture. The processing of the plurality of possible meanings for the human gesture and the context determined at block 104 may be, for example, a semantic mapping process that maps the context to each of the plurality of possible meanings for the human gesture to associate an accumulated score with each of the plurality of possible meanings of the determined gesture. In some embodiments, the database of predetermined possible meanings may be modified or calibrated for a particular use or application. For example, for an implementation of system 100 in a restaurant setting, the database of possible meanings may be calibrated to give greater consideration and/or assign a greater weight to possible meanings related to a restaurant setting than to possible meanings that are not related to a restaurant setting.

As one example, system 100, executing on the computing device, may receive a visual image asset at block 102 that depicts one or more persons standing alongside a road with passing traffic, with one or more of the persons performing a gesture. At block 104, system 100 may determine a context in which the one or more persons performed the gesture by performing an image analysis of the visual image asset. For example, the computing device executing system 100 may perform a facial recognition image analysis to determine that the one or more persons are depicted in the visual image asset, may perform a location identification image analysis to determine that the one or more persons are on the side of the road, and may perform an image analysis to determine that a bus is located on the road. At block 106, system 100 may determine that the one or more persons are performing a gesture comprised of a closed first with a thumb extending outward in a direction away from the first (e.g., a "thumbs-up" gesture). At block 108, system 100 may search for and determine a plurality of possible meanings for the gesture such as, for example, an indication of approval, a representation of the number one, and a sign indicating that the one or more persons are in need of a ride (e.g., hitch-hiking). System 100 may further determine that in some locations and/or cultures the gesture may be deemed to have an offensive meaning and is not socially acceptable. Customarily, gesture determination systems of the current state of the art would identify the gesture as meaning an indication of approval. However, using the determined context of person standing alongside a road on which traffic is passing, system 100 may filter the plurality of possible meanings to determine a true and/or contextual meaning of the gesture as an indication that the one or more persons are in need of a ride, thereby providing an improvement over the systems of the current state of the art by more accurately identifying the true meaning of the gesture by determining and considering the context in which the gesture was performed.

As another example, system 100, executing on the computing device, may receive a visual image asset at block 102 that depicts a person performing a gesture. At block 104, system 100 may determine a context in which the person performed the gesture by performing an image analysis of the visual image asset. For example, the computing device executing system 100 may perform a facial recognition image analysis to determine that a person is depicted in the visual image asset, as well as identify culturally or ethnically distinct characteristics of the person, may perform a clothing identification analysis to determine that the person is wearing clothing and/or accessories that are indicative of a particular culture, ethnicity, and/or religion, and may perform a location identification image analysis to determine a probable location at which the person is performing the gesture (e.g., based on graphic and/or textual signs or identifiers depicted proximate to the person in the visual image asset). At block 106, system 100 may determine that the person is performing a gesture comprised of shaking the person's head. At block 108, system 100 may search for and determine a plurality of possible meanings for the gesture such as, for example, an indication of confusion, an indication of "no," or an indication of "yes." Customarily, gesture determination systems of the current state of the art would identify the gesture as meaning an indication of "no." However, using the determined context of person such as an indication of the person's likely cultural, ethnic, or religious identity and probable location, system 100 may determine cultural and/or social moralities for the person's likely cultural, ethnic, or religious identity and probable location and filter the plurality of possible meanings to determine a true and/or contextual meaning of the gesture as an indication of "yes," thereby providing an improvement over the systems of the current state of the art by more accurately identifying the true meaning of the gesture by determining and considering the context in which the gesture was performed.

As yet another example, system 100, executing on the computing device, may receive a visual image asset at block 102 that depicts a person performing a gesture. At block 104, system 100 may determine a context in which the person performed the gesture by performing an image analysis of the visual image asset. For example, the computing device executing system 100 may perform an image analysis that indicates that the person performing the gesture is interacting with an electronic device (e.g., an electronic device that operates responsive to motion based commands entered by way of the person's hand(s)). At block 106, system 100 may determine that the person is performing a gesture comprised of placing an index finger and a thumb of a hand of the person together with remaining fingers of the hand extending in an outward direction. At block 108, system 100 may search for and determine a plurality of possible meanings for the gesture such as, for example, an indication of agreement or affirmation (e.g., "OK"), a numerical meaning of three, or a pinching command corresponding to a motion-controlled electronic device (e.g., a grab/copy command). Customarily, gesture determination systems of the current state of the art would identify the gesture as meaning an indication of "OK." However, using the determined context of interacting with an electronic device, system 100 may filter the plurality of possible meanings with an increased weight being given to meanings related to interactions with an electronic device to determine a true and/or contextual meaning of the gesture as a grab/copy command, thereby providing an improvement over the systems of the current state of the art by more accurately identifying the true meaning of the gesture by determining and considering the context in which the gesture was performed. In this manner, various embodiments here, such as the gesture meaning determination of system 100, provide a specific improvement to the functionality of computer systems performing gesture recognition, identification, and/or definition (e.g., such as determining a meaning for a gesture) by determining and providing a more accurate meaning for the gesture based on the use of contextual information related to the entity who performed the gesture or an area in which the gesture was performed.

After determining the true and/or contextual meaning of the human gesture, in some embodiments the computing system may execute certain methods, protocols, and or processes responsive to the true and/or contextual meaning of the human gesture, for example, to interact with the entity performing the human gesture to, for example, solicit information and/or input from the entity and/or deliver information to the entity. In other embodiments, the computing system may transmit the true and/or contextual meaning of the human gesture to cause the true and/or contextual meaning of the human gesture to be displayed on a display of, or associated with, the computing device and/or to be displayed on a display associated with a user equipment with which the computing device is communicatively coupled. In yet other embodiments, the computing system may transmit the true and/or contextual meaning of the human gesture to a user equipment to cause the user equipment to the true and/or contextual meaning of the human gesture.

Figure 2:
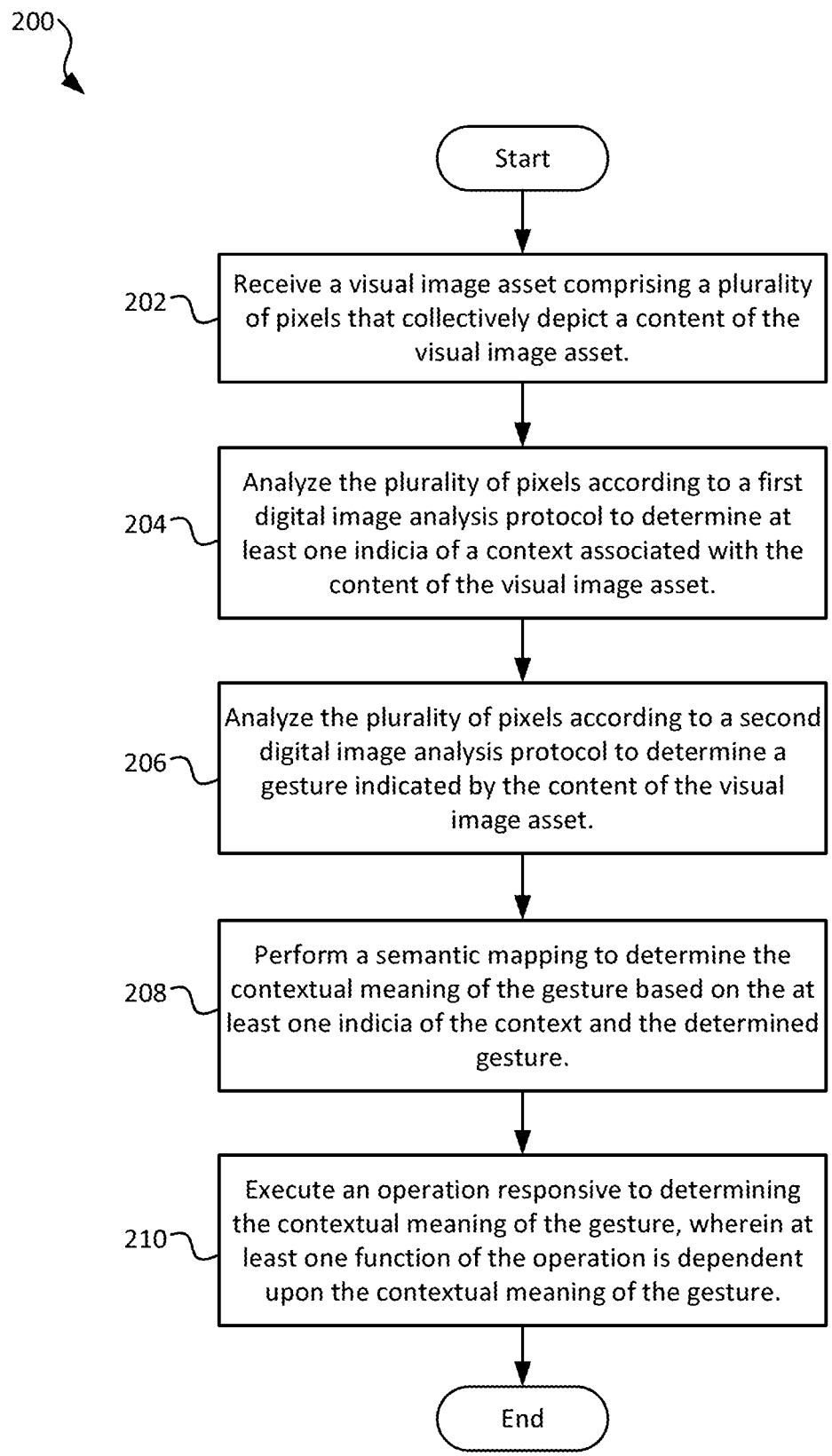
FIG. 2 depicts a flowchart of a method for determining a contextual meaning of a gesture according to various embodiments.

Turning now to FIG. 2, a flowchart of a method 200 for determining a contextual meaning of a gesture according to various embodiments is shown. Method 200 is a computer-implemented method, implemented by a computing device such as computing device 500, discussed below, to determine a meaning of a gesture depicted in a visual image asset such as a photograph and/or a video. The disclosed embodiments of method 200 have the advantage of determining a meaning of a gesture depicted in a visual image asset such as a photograph and/or a video based on a determined context in which the gesture is performed, thereby determining a more accurate meaning of the gesture when compared to systems of the current state of the art. It should be understood that while method 200 is illustrated and described with reference to the following steps, one or more of the following steps of method 200 may be omitted and/or combined with any one or more other step of method 200. Further, the following steps of method 200 may be implemented in any order, may be implemented substantially concurrently (e.g., beginning and/or occurring at approximately the same time while not necessarily ending at the same time), consecutively, or both, and are not to be limited based on an order of discussion presented herein.

At step 202, the computing device receives a visual image asset that comprises a plurality of pixels that collectively depict a content of the visual image asset. The visual image asset may be a photograph and/or a video in which the pixels depicts the content including at least one entity (e.g., a person and/or a non-human entity such as a machine capable of performing and/or displaying a gesture) performing a gesture, and one or more indicia of a context associated with the content. The visual image asset may be received by the computing device from an imaging sensor (e.g., a camera) coupled to the computing device, may be received by the computing device via a communication network, or may be received by any other suitable communication means.

At step 204, the computing device analyzes the plurality of pixels according to a first digital image analysis protocol to determines at least one indicia of the context associated with the content of the visual image asset. The computing device may determine the at least one indicia of the context, at least in part, according to a process of image analysis, for example, in a manner substantially similar to the functionality of block 104 of system 100, as discussed above. Based on the at least one indicia of the context, the computing device may determine one or more cultural and/or societal customs or normalcies associated with a culture, ethnicity, religion, and/or geographic area associated with, or identified based on, the at least one indicia of the context. At step 206, the computing device analyzing the plurality of pixels according to a second digital image analysis protocol to determines a gesture indicated by the content of the visual image asset. The computing device may determine the gesture, at least in part, according to a process of image analysis, for example, in a manner substantially similar to the functionality of block 106 of system 100, as discussed above.

At step 208, the computing device determines the contextual meaning of the gesture based on the at least one indicia of the context and the determined gesture. The computing device may determine the contextual meaning of the gesture, at least in part, in a manner substantially similar to the functionality of block 108 of system 100, as discussed above. For example, based on the gesture determined at step 206, the computing device may identify one or more possible meanings of the gesture and, according to the geographic area associated with the at least one indicia of the context, determine a probability of accuracy for each of the one or more possible meanings. The computing device may determine one of the one or more possible meanings of the gesture that is determined to have a highest probability of accuracy from among a remainder of the one or more possible meanings of the gesture as the contextual and/or true meaning of the gesture.

At step 210, the computing device executes an operation responsive to determining the contextual meaning of the gesture, wherein at least one function of the operation is dependent upon the contextual meaning of the gesture. The operation may be, for example, transmitting the contextual meaning of the gesture to a user equipment. In various embodiments, transmitting the contextual meaning of the gesture to the user equipment may cause the user equipment to perform one or more actions responsive to the computing device transmitting, and/or the user equipment receiving, the contextual meaning of the gesture. As one example, transmitting the contextual meaning of the gesture to the user equipment may cause the user equipment to display the contextual meaning of the gesture via a display device associated with the user equipment. As another example, transmitting the contextual meaning of the gesture to the user equipment may cause the user equipment to generate, modify, and/or present one or more user interface elements via a display device associated with the user equipment and according to the contextual meaning. As yet another example, transmitting the contextual meaning of the gesture to the user equipment may cause the user equipment to transmit a message having a relationship to the contextual meaning via one or more communication medium. Generally, transmitting the contextual meaning of the gesture to the user equipment may cause the user equipment to execute one or more actions, algorithms, functions, methods, processes, protocols, or other computer executable operations that effect a modification of at least a portion of the user equipment in response to the contextual meaning (e.g., by modifying a display output, a memory structure, a processor execution, etc. of the user equipment or another device coupled to and/or associated with the user equipment).

In other embodiments, the computing device may itself execute one or more actions, algorithms, functions, instructions, methods, processes, programs protocols, or other computer executable operations that effect a modification of at least a portion of the user equipment in response to the contextual meaning in combination with, or in place of, the user equipment. For example, in response to determining the contextual meaning of the gesture, the computing device may initiate a communication session over a communication medium, may generate, modify, and/or present one or more user interface elements via a display device associated with the computing device and according to the contextual meaning, may solicit input from, and/or deliver output to, a user, etc. The operations executed by the computing device may be, at least in part, dependent and/or determined according to the contextual meaning of the gesture. For example, execution of the operations may be directed by, controlled by, and/or customized according to the contextual meaning of the gesture.

Figure 3:
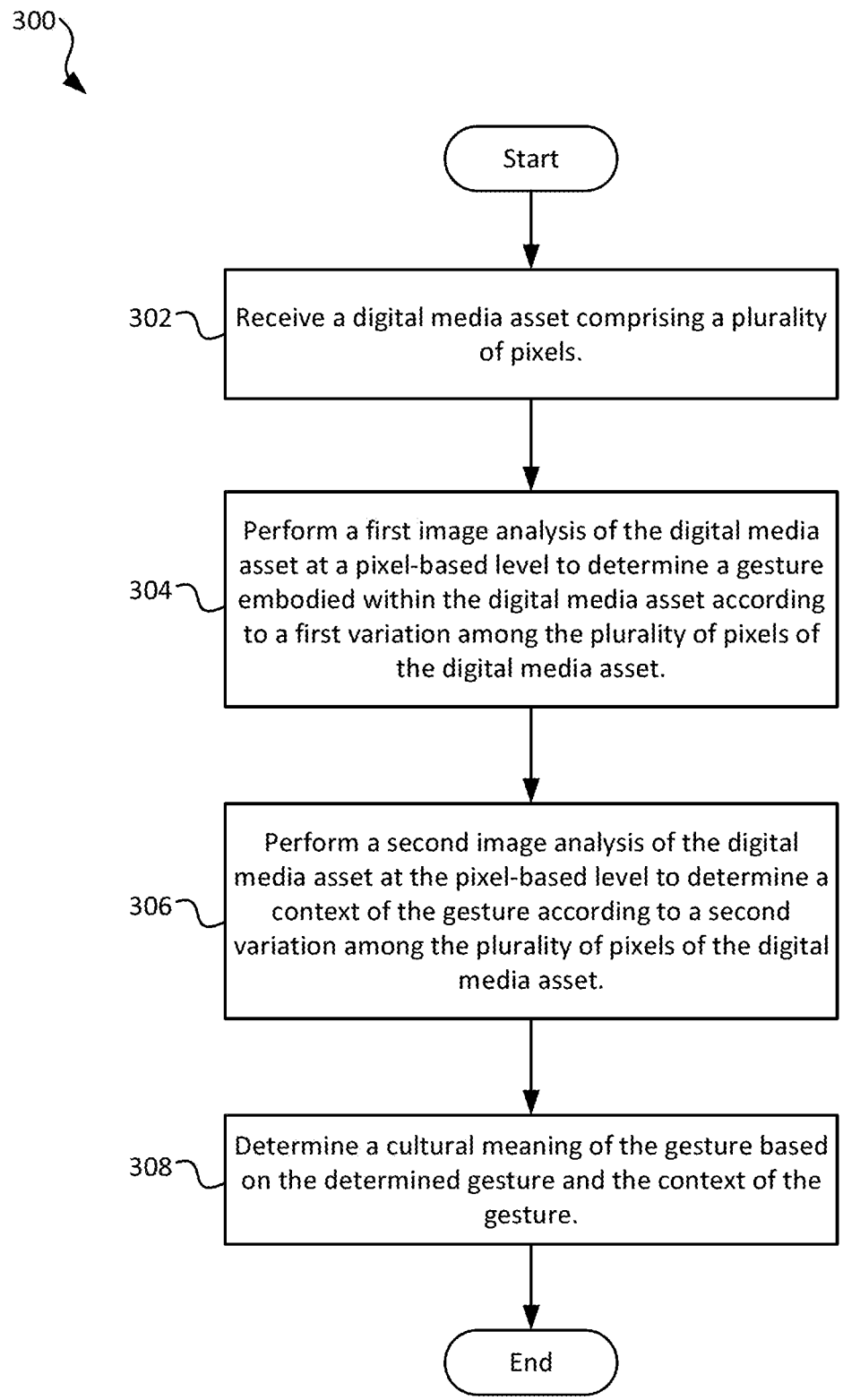
FIG. 3 depicts a flowchart of a method for determining a cultural meaning of a gesture according to various embodiments.

Turning now to FIG. 3, a flowchart of a method 300 for determining a cultural meaning of a gesture according to various embodiments is shown. Method 300 is a computer-implemented method, implemented by a computing device such as computing device 500, discussed below, to determine a meaning of a gesture depicted in a visual image asset such as a photograph and/or a video. The disclosed embodiments of method 300 have the advantage of determining a meaning of a gesture depicted in a visual image asset such as a photograph and/or a video based on a determined cultural context in which the gesture is performed, thereby determining a more accurate meaning of the gesture when compared to systems of the current state of the art. It should be understood that while method 300 is illustrated and described with reference to the following steps, one or more of the following steps of method 300 may be omitted and/or combined with any one or more other step of method 300. Further, the following steps of method 300 may be implemented in any order, may be implemented substantially concurrently (e.g., beginning and/or occurring at approximately the same time while not necessarily ending at the same time), consecutively, or both, and are not to be limited based on an order of discussion presented herein.

At step 302, the computing device receives a digital media asset that comprises a plurality of pixels. The digital media asset may be a photograph and/or a video that depicts a content including at least one entity (e.g., a person and/or a non-human entity such as a machine capable of performing and/or displaying a gesture) performing a gesture, and a context associated with the content located visually proximate to the gesture. The digital media asset may be received by the computing device from an imaging sensor (e.g., a camera) coupled to the computing device, may be received by the computing device via a communication network, or may be received by any other suitable communication means.

At step 304, the computing device performs a first image analysis of the digital media asset at a pixel-based level to determine the gesture embodied within the digital media asset according to a first relationship (e.g., a similarity or a variation) among the plurality of pixels of the digital media asset. The computing device may determine the gesture, at least in part, according to a process of image analysis, for example, in a manner substantially similar to the functionality of block 106 of system 100, as discussed above. At step 306, the computing device performs a second image analysis of the digital media asset at the pixel-based level to determine the context of the gesture according to a second relationship (e.g., a similarity or a variation) among the plurality of pixels of the digital media asset. The computing device may determine the context of the gesture, at least in part, according to a process of image analysis, for example, in a manner substantially similar to the functionality of block 104 of system 100, as discussed above. The context of the gesture may be represented by one or more context metadata values that each indicates an element of context of the gesture. Based on the context of the gesture, the computing device may determine one or more cultural and/or societal customs or normalcies associated with a culture, ethnicity, religion, and/or geographic area associated with, or identified based on, the context of the gesture.

At step 308, the computing device determines a cultural meaning of the gesture based on the determined gesture and the context of the gesture. The computing device may determine the contextual meaning of the gesture, at least in part, in a manner substantially similar to the functionality of block 108 of system 100, as discussed above. For example, based on the gesture determined at step 304, the computing device may identify a plurality of potential meanings of the gesture and, according to the geographic area associated with the context of the gesture, determine an associated score for each of the plurality of potential meanings. The computing device may determine one of the plurality of potential meanings of the gesture that is determined to have an highest accumulated score that exceeds a threshold as the cultural and/or true meaning of the gesture. Optionally, the computing device may be configured to execute an operation responsive to cultural meaning of the gesture and/or transmit the cultural meaning of the gesture to a user equipment to cause the user equipment to perform one or more actions, for example, in a manner substantially similar to the functionality of step 210 of method 200, as discussed above.

Figure 4:
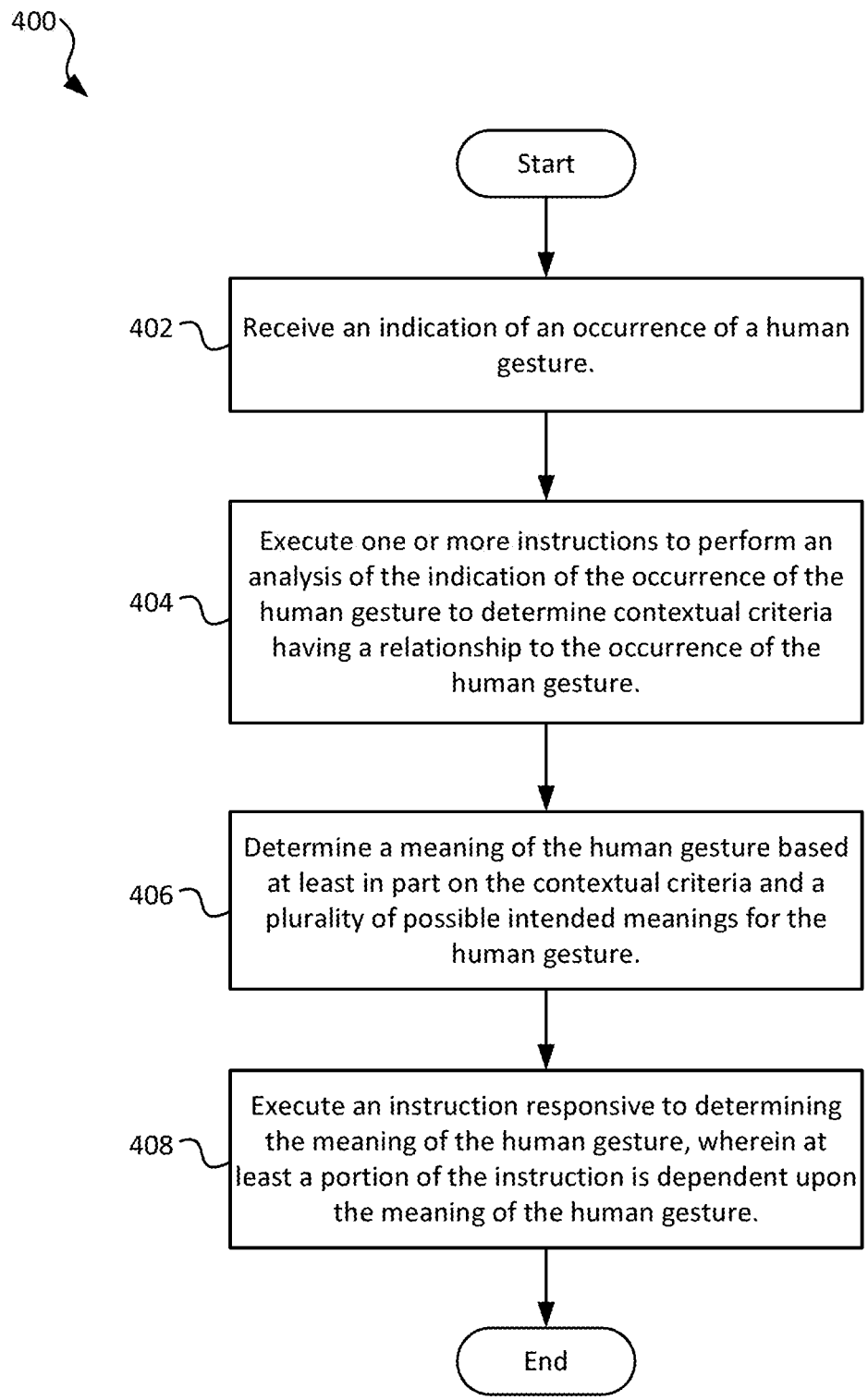
FIG. 4 depicts a flowchart of a method determining a meaning of a human gesture according to various embodiments.

Turning now to FIG. 4, a flowchart of a method 400 for determining a meaning of a human gesture according to various embodiments is shown. Method 400 is a computer-implemented method, implemented by a computing device such as computing device 500, discussed below, to determine a meaning of a human gesture depicted in a visual image asset such as a photograph and/or a video. The disclosed embodiments of method 400 have the advantage of determining a meaning of a human gesture depicted in a visual image asset such as a photograph and/or a video based on contextual criteria, thereby determining a more accurate meaning of the gesture when compared to systems of the current state of the art. It should be understood that while method 400 is illustrated and described with reference to the following steps, one or more of the following steps of method 400 may be omitted and/or combined with any one or more other step of method 400. Further, the following steps of method 400 may be implemented in any order, may be implemented substantially concurrently (e.g., beginning and/or occurring at approximately the same time while not necessarily ending at the same time), consecutively, or both, and are not to be limited based on an order of discussion presented herein.

At step 402, the computing device receives an indication of an occurrence of a human gesture. The indication of the occurrence of the human gesture may be, for example, a visual image or digital media asset such as a photograph and/or a video that depicts the human gesture and contextual criteria having a relationship to the occurrence of the human gesture. The indication of the occurrence of the human gesture may be received by the computing device from an imaging sensor (e.g., a camera) coupled to the computing device, may be received by the computing device via a communication network, or may be received by any other suitable communication means.

At step 404, the computing device executes one or more instructions to perform an analysis of the indication of the occurrence of the human gesture to determine contextual criteria having a relationship to the occurrence of the human gesture. The computing device may determine the contextual criteria, at least in part, according to a process of image analysis, for example, in a manner substantially similar to the functionality of block 104 of system 100, as discussed above. Based on the contextual criteria, the computing device may determine one or more cultural and/or societal customs or normalcies associated with a culture, ethnicity, religion, and/or geographic area associated with, or identified based on, the contextual criteria.

At step 406, the computing device determines a meaning of the human gesture based at least in part on the contextual criteria and a plurality of possible intended meanings for the human gesture. The computing device may determine the meaning of the human gesture, at least in part, in a manner substantially similar to the functionality of block 108 of system 100, as discussed above. For example, based on the received indication of the occurrence of the human gesture, the computing device may identify the plurality of possible intended meanings for the human gesture and, according to the contextual criteria (e.g., determined based on surroundings of the occurrence of the human gesture), filter the plurality of possible intended meanings for the human gesture (e.g., according to a semantic mapping process) to determine the meaning of the human gesture. At step 408, the computing device executes an instruction responsive to determining the meaning of the human gesture, wherein at least a portion of the instruction is dependent upon the meaning of the human gesture, for example, in a manner substantially similar to the functionality of step 210 of method 200, as discussed above.

It should be noted that while the above descriptions of system 100 and methods 200, 300, and 400 have generally taken place with respect to a human gesture (e.g., as performed by person), the present disclosure is not limited thereto. In various embodiments, the present disclosure additionally contemplates use of the disclosed methods in the context of machine generated and/or displayed gestures. For example, the computing device may implement system 100 and/or methods 200, 300, and/or 400 in determining a meaning of a gesture performed by a machine (e.g., through articulation of appendages of the machine that may emulate human gestures) or displayed by a machine (e.g., through display of a visual representation of a human gesture on a display screen associated with the machine). The machine may be, for example, a virtual and/or robotic assistant, a humanoid machine, a kiosk, or any other machine meant to receive and/or transmit information in a communicative manner, and may include one or more interfaces capable of communicating (e.g., receiving and/or transmitting) information visually, audibly, or electronically.

In some embodiments, the computing device may provide gesture meaning determination services, such as execution of system 100 and/or methods 200, 300, and/or 400, to subscribers as a software as a service offering. In such embodiments, the subscribers may pay a fee for accessing the gesture meaning determination services, and in return have an ability to submit visual image assets containing an individual performing a human gesture and receive a meaning of the human gesture being performed by the individual.

Figure 5:
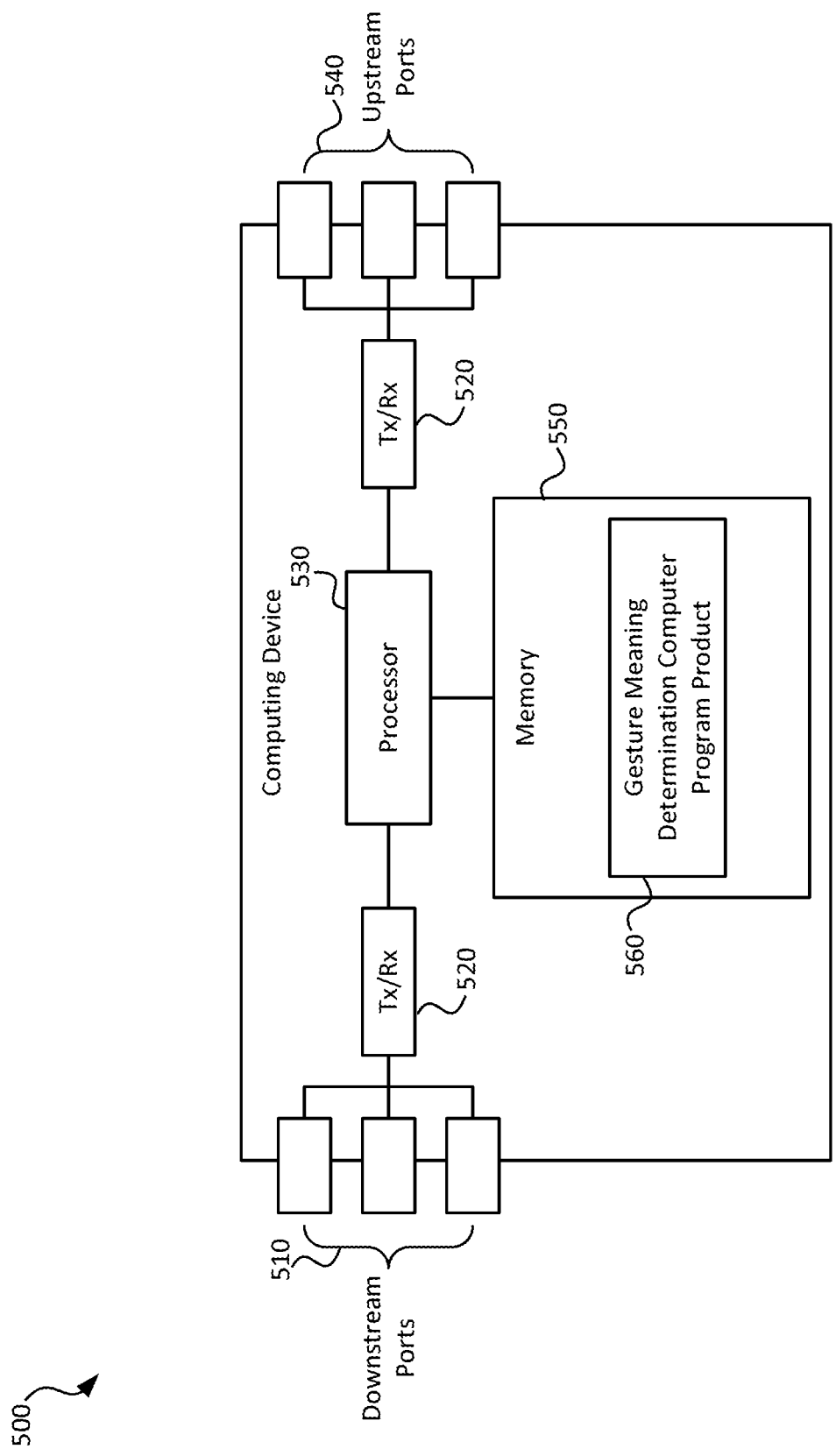
FIG. 5 depicts a computing device according to various embodiments.

With reference now to FIG. 5, a schematic diagram of a computing device 500 according to various embodiments is shown. Computing device 500 may be any suitable processing device capable of performing the functions disclosed herein such as a computer system, a server, a cloud computing node (e.g., as discussed below with respect to FIG. 1 and/or FIG. 2), or may be generally representative of a distributed computing device in which one or more components of computing device 500 are distributed or shared across one or more devices. Computing device 500 is configured to implement at least some of the features/methods disclosed herein, for example, the gesture meaning determination of system 100 and/or methods 200, 300, and/or 400, discussed above. In various embodiments, for instance, the features/methods of this disclosure are implemented using hardware, firmware, and/or software installed to run on hardware.

Computing device 500 is a device (e.g., an access point, an access point station, a router, a switch, a gateway, a bridge, a server, a client, a user-equipment, a mobile communications device, etc.) that transports data through a network, system, and/or domain, and/or provides services to other devices in a network or performs computational functions. In one embodiment, the computing device 500 is an apparatus and/or system configured to implement the gesture meaning determination of system 100 and/or methods 200, 300, and/or 400, for example according to a computer program product.

The computing device 500 comprises one or more downstream ports 510 coupled to a transceiver (Tx/Rx) 520, which are transmitters, receivers, or combinations thereof. The Tx/Rx 520 transmits and/or receives frames from other computing devices via the downstream ports 510. Similarly, the computing device 500 comprises another Tx/Rx 520 coupled to a plurality of upstream ports 540, wherein the Tx/Rx 520 transmits and/or receives frames from other nodes via the upstream ports 540. The downstream ports 510 and/or the upstream ports 540 may include electrical and/or optical transmitting and/or receiving components. In another embodiment, the computing device 500 comprises one or more antennas (not shown) coupled to the Tx/Rx 520. The Tx/Rx 520 transmits and/or receives data (e.g., packets) from other computing or storage devices wirelessly via the one or more antennas.

A processor 530 is coupled to the Tx/Rx 520 and is configured to determine a meaning of a human gesture, for example, at least in part according to an image analysis that determines and analyzes contextual information located proximate to an individual expressing the human gesture as depicted in a visual image asset. In an embodiment, the processor 530 comprises one or more multi-core processors and/or memory modules 550, which functions as data stores, buffers, etc. The processor 530 is implemented as a general processor or as part of one or more application specific integrated circuits (ASICs), field-programmable gate arrays (FPGAs), and/or digital signal processors (DSPs). Although illustrated as a single processor, the processor 530 is not so limited and alternatively comprises multiple processors. The processor 530 further comprises processing logic configured to execute a gesture meaning determination computer program product 560 that is configured to determine the meaning of the human gesture according to the image analysis of the visual image asset.

FIG. 5 also illustrates that a memory module 550 is coupled to the processor 530 and is a non-transitory medium configured to store various types of data. Memory module 550 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 550 may be used to house the instructions for carrying out the various embodiments described herein. For example, the memory module 550 may comprise the gesture meaning determination computer program product 560, which is executed according by processor 530.

It is understood that by programming and/or loading executable instructions onto the computing device 500, at least one of the processor 530 and/or the memory module 550 are changed, transforming the computing device 500 in part into a particular machine or apparatus, for example, a gesture meaning determination device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
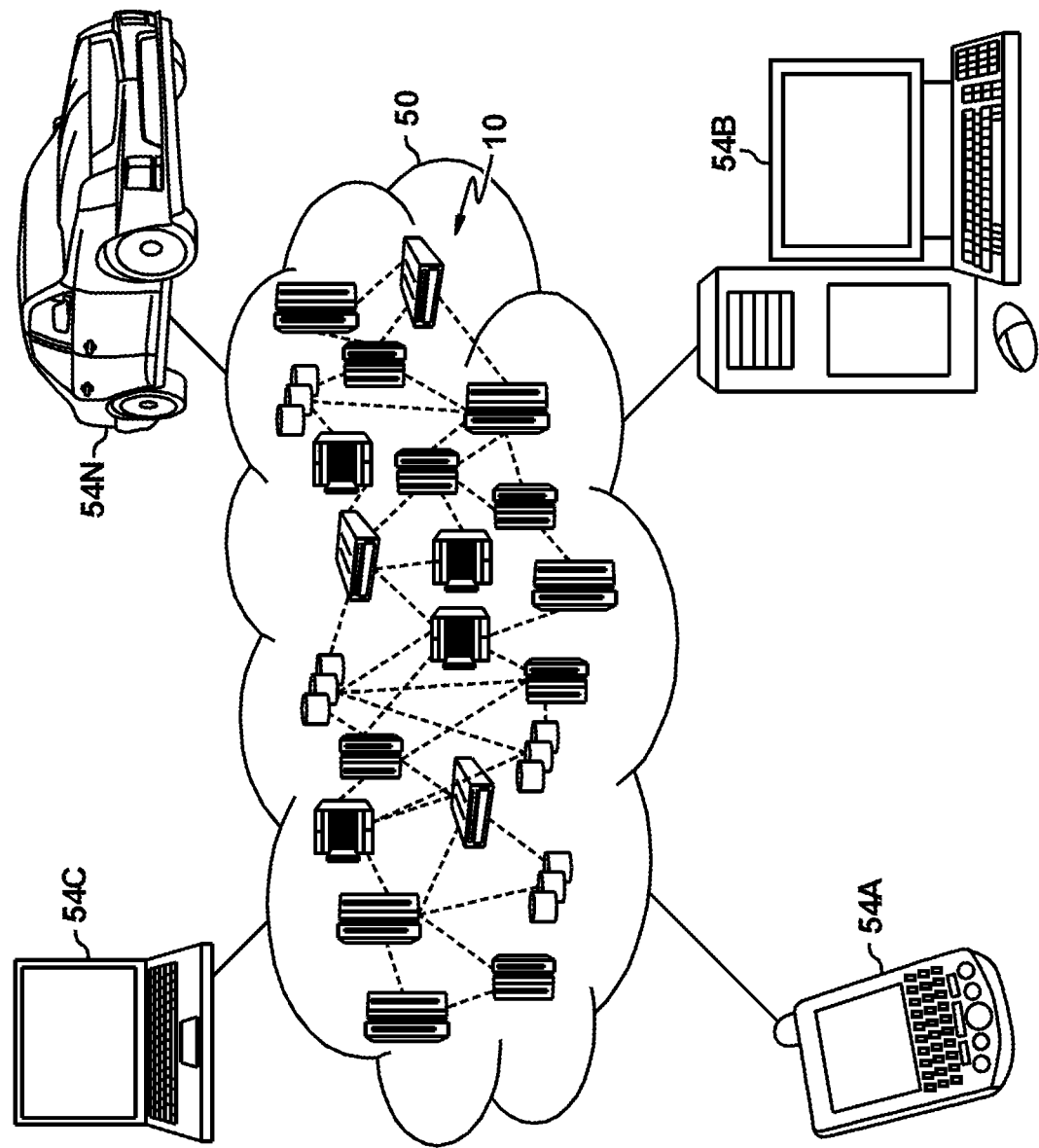
FIG. 6 depicts a cloud computing environment according to various embodiments.
Figure 7:
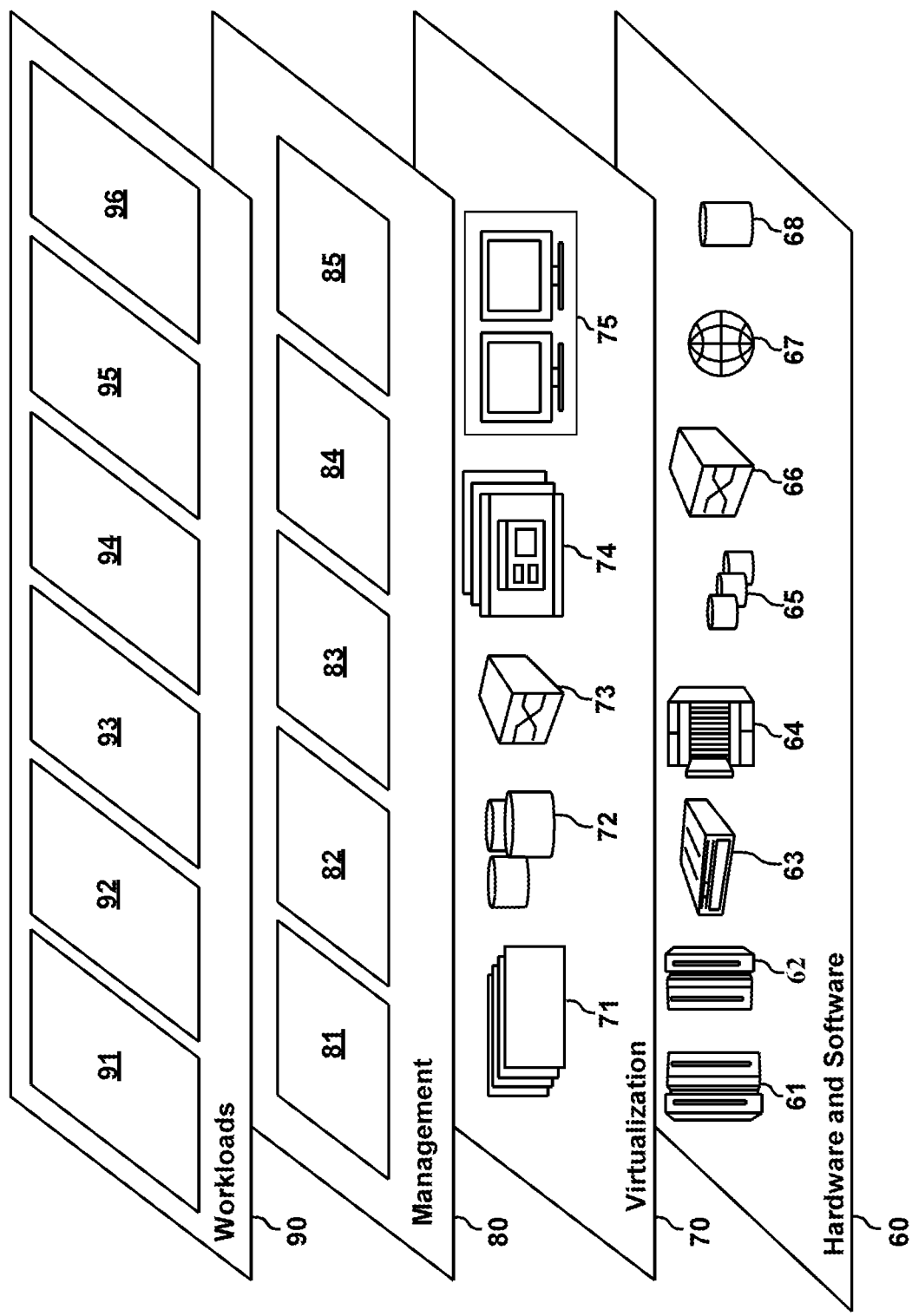
FIG. 7 depicts abstraction model layers according to various embodiments.

Turning now to FIGS. 6 and 7, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the gesture meaning determination described below.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtual layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and gesture meaning determination 96. These workloads and functions of workloads layer 90 may be end-user applications that enable a subscriber to cloud computing infrastructure 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing infrastructure 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for determination of a contextual meaning of human gestures, the computer program product comprising a computer readable storage medium having program instructions embodied therewith, the program instructions executable by a processor to cause the processor to:

receive a visual image asset comprising a plurality of pixels that collectively depict a content of the visual image asset;

analyze the plurality of pixels according to a first digital image analysis protocol to determine at least one indicia of a context associated with the content of the visual image asset;

analyze the plurality of pixels according to a second digital image analysis protocol to determine a gesture indicated by the content of the visual image asset;

perform a semantic mapping to determine the contextual meaning of the gesture based on the at least one indicia of the context and the determined gesture; and execute an audiovisual output operation responsive to determining the contextual meaning of the gesture, wherein at least one function of the operation is dependent upon the contextual meaning of the gesture and modified from a prior state based on the contextual meaning of the gesture.

2. The computer program product of claim 1, wherein at least one of the first digital image analysis and the second digital image analysis is selected from among a group consisting of facial recognition, clothing recognition, location identification, temporal identification, and role identification.

3. The computer program product of claim 1, wherein the at least one indicia of the context associated with the content of the visual image asset indicates a contextual characteristic selected from among a group consisting of culture, ethnicity, religion, country, region, location, setting, role, and time.

4. The computer program product of claim 1, wherein the gesture is performed by a non-human entity.

5. The computer program product of claim 1, wherein executing the program instructions further causes the processor to determine a geographic area associated with the at least one indicia of the context.

6. The computer program product of claim 5, wherein performing the semantic mapping to determine the contextual meaning of the gesture comprises:
- determining one or more cultural and societal customs corresponding to the geographic area associated with the at least one indicia of the context;
- determining one or more possible meanings of the gesture;
- mapping the one or more cultural and societal customs to the one or more possible meanings of the gesture to determine a probability of accuracy for each of the one or more possible meanings of the gesture according to the geographic area associated with the at least one indicia of the context indicated;
- determining a possible meaning of the gesture having a highest determined probability of accuracy and selected from among the one or more possible meanings of the gestures as the contextual meaning of the gesture; and
- executing an audiovisual output operation responsive to determining the contextual meaning of the gesture, wherein at least one function of the operation is dependent upon the contextual meaning of the gesture and modified from a prior state based on the contextual meaning of the gesture.

7. The computer program product of claim 1, wherein the computer program product is executed in a cloud environment as a software as a service.

8. A computer-implemented method, comprising:
- receiving a digital media asset comprising a plurality of pixels;
- performing a first image analysis of the digital media asset at a pixel-based level to determine a gesture embodied within the digital media asset according to a first relationship among the plurality of pixels of the digital media asset;
- performing a second image analysis of the digital media asset at the pixel-based level to determine a context of the gesture according to a second relationship among the plurality of pixels of the digital media asset; and
- determining a cultural meaning of the gesture based on the determined gesture and the context of the gesture.

9. The computer-implemented method of claim 8, wherein determining the cultural meaning of the gesture comprises:
- determining an area associated with the context of the gesture;
- determining a plurality of potential meanings of the determined gesture; and
- determining the cultural meaning of the gesture based on the plurality of potential meanings of the determined gesture and the area associated with the context of the gesture.

10. The computer-implemented method of claim 9, wherein determining the cultural meaning of the gesture based on the plurality of potential meanings of the determined gesture and the area associated with the context of the gesture comprises:
- determining a score for each of a plurality of context metadata values based on the content of the digital media asset;
- mapping each of the plurality of context metadata values to each of the plurality of potential meanings of the determined gesture to associate an accumulated score with each of the plurality of potential meanings of the determined gesture; and
- selecting the cultural meaning of the gesture as one of the plurality of potential meanings of the determined gesture from among the plurality of potential meanings of the determined gesture based at least in part on a determination that the accumulated score of the one of the plurality of potential meanings of the determined gesture exceeds a threshold.

11. The computer-implemented method of claim 8, wherein the second image analysis is selected from a group consisting of facial recognition, clothing recognition, location identification, temporal identification, and role identification.

12. The computer-implemented method of claim 11, wherein the second image analysis determines one or more facial recognition context metadata values selected from a group consisting of race, gender, and ethnicity.

13. The computer-implemented method of claim 11, wherein the second image analysis determines one or more clothing recognition context metadata values selected from a group consisting of culture, religion, and country.

14. The computer-implemented method of claim 11, wherein the second image analysis determines one or more location identification context metadata values selected from a group consisting of region, country, location, and setting.

15. The computer-implemented method of claim 8, wherein the computer-implemented method is implemented in a cloud environment as a software as a service.

* * * * *